April 4, 1961  E. A. THOMPSON  2,978,117
AUTOMATIC LOADING DEVICE
Filed March 7, 1957  5 Sheets-Sheet 1

INVENTOR.
EARL A. THOMPSON
BY
ATTORNEYS.

INVENTOR.
EARL A. THOMPSON
BY
ATTORNEYS.

INVENTOR.
EARL A. THOMPSON

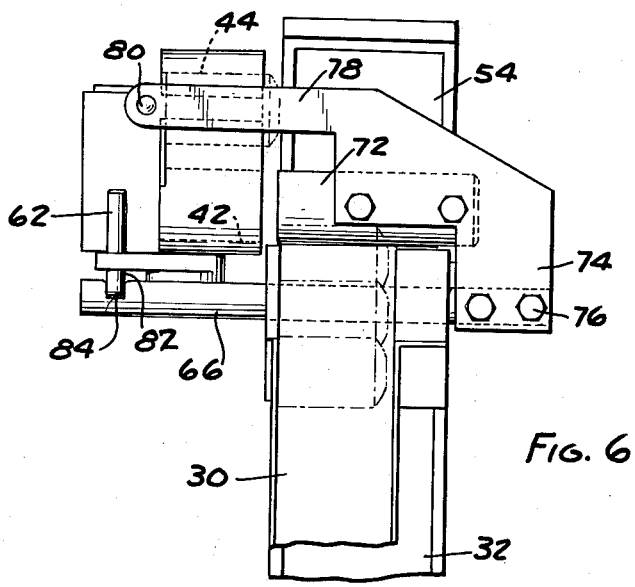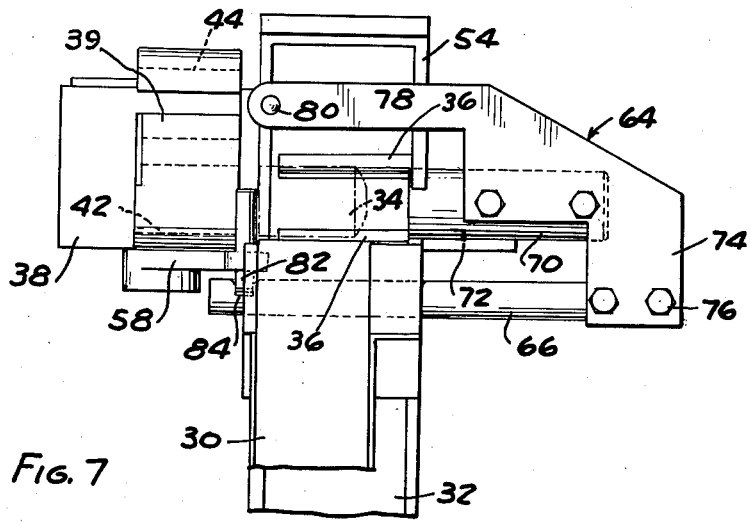

INVENTOR.
EARL A. THOMPSON
BY
ATTORNEYS.

United States Patent Office 2,978,117
Patented Apr. 4, 1961

2,978,117
AUTOMATIC LOADING DEVICE
Earl A. Thompson, Ferndale, Mich.
(1300 Hilton Road, Ferndale Station, Detroit 20, Mich.)
Filed Mar. 7, 1957, Ser. No. 644,553
24 Claims. (Cl. 214—1)

This invention relates to an automatic work loading and unloading device particularly adapted for use with machine tools.

In various types of machine tools that are used for production work, grinders, for example, it is very desirable to incorporate in the machine tool a device for automatically and quickly loading and unloading the collet in which the work piece is held while it is being worked upon. An automatic loading device of this type must be capable of performing rapidly and in timed sequences the following operations: (a) receive a work piece from the collet, (b) load the collet with the next work piece, (c) move a work piece from a loading station to a position in alignment with the collet, and (d) move a finished work piece from the collet to a discharging station.

In order to obtain high volume production, it is obvious that these sequences must be performed in a minimum of time, that is, the loading device must operate at a relatively rapid rate and the distance through which the loading arm or equivalent member must move in order to complete one cycle of operation must be held to a minimum. Furthermore, it is apparent that the movement of the loading arm has to be controlled very accurately between its various positions.

It is an object of this invention to provide an automatic loading and unloading device that is constructed so that the work holding member of a machine tool, a collet, for example, can be loaded and unloaded efficiently in a very short time cycle.

A further object of this invention resides in the provision of a loading and unloading device having very few moving parts so that mechanical difficulties are reduced to a minimum.

A further object of this invention resides in the provision of a loading and unloading device and a hydraulic mechanism for accurately controlling the actuation of the device.

A still further object of the invention resides in the provision of an automatic loading and unloading device which is designed so that the total movement of the work loading arm through one complete cycle is reduced to a minimum.

In the drawings:

Fig. 6 is a fragmentary top plan view of the device showing the relative positions of its components when a work piece is to be discharged from the work loading arm.

Fig. 7 is a view similar to Fig. 6 showing the relative positions of the components as a work piece is being loaded onto the work loading arm.

Figure 1:
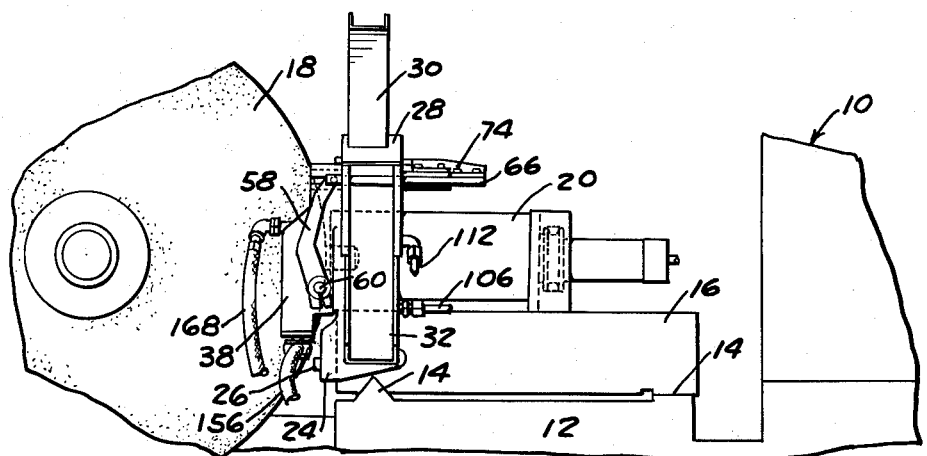
Fig. 1 is an end elevational view of an automatic loading and unloading device of this invention mounted on a grinder.

Referring more particularly to Fig. 1, the machine tool on which the device of this invention is used is shown by way of example as a grinder 10 having a base 12 provided with ways 14 on which a table 16 is mounted for movement transversely across the peripheral face of a grinding wheel 18. A spindle 20 mounted on table 16 includes a collet 22 (Fig. 3) for holding the work piece to be ground by wheel 18. The loading device of this invention includes a base 24 in the form of a cast housing that is secured to table 16 as by screws 26. A chute adapter 28 is fixedly mounted on base 24. Adapter 28 supports a feed chute 30 and a discharge chute 32. Chute 30 is adapted to be loaded with a plurality of work pieces 34 which gravitate to a position resting upon a plurality of pins 36 (Fig. 4) mounted on adapter 28. A loading arm in the form of a casting generally designated 38 is pivotally mounted on base 24 by means of a shaft 40. At its upper end, arm 38 is fashioned with a head 39 having a pair of cylindrical sockets 42 and 44. Socket 42 is provided with an axial slot 46 at one side thereof and socket 44 is likewise provided with an axial slot 48 along the upper portion thereof. Sockets 42 and 44 are located on an arc struck about the axis of shaft 40 as a center. A plate 50 partially closes one end of sockets 42 and 44.

Figure 3:
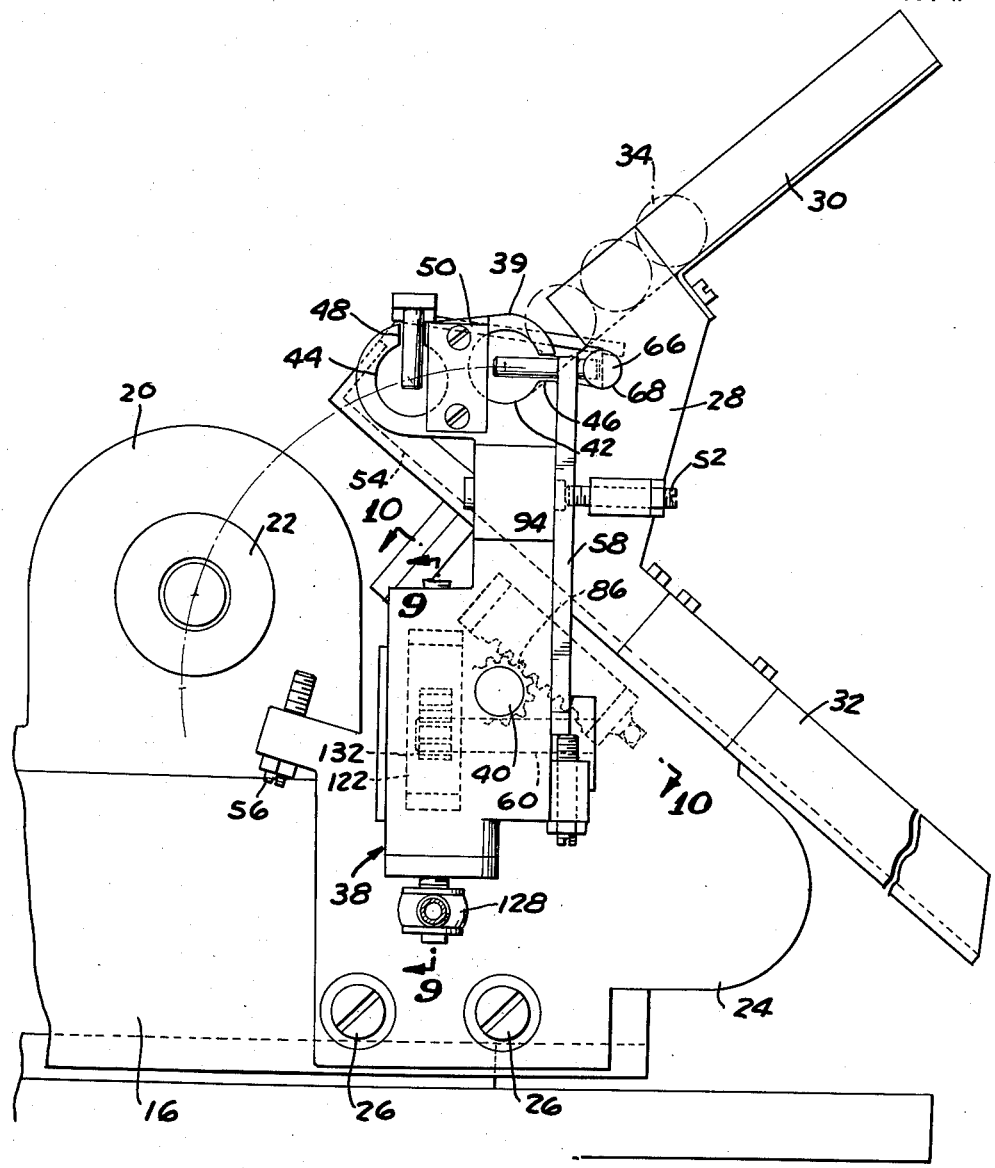
Fig. 3 is a fragmentary side elevational view of the device of this invention with the loading arm in the position for receiving a work piece.

An adjustable stop screw 52 on adapter 28 is arranged to limit the pivotal movement of arm 38 in one direction to the position shown in Fig. 3 wherein socket 42 is aligned axially with the work piece 34 supported on pins 36. In this position of arm 38, socket 44 is disposed adjacent the upper end of a discharge chute formation 54 on adapter 28. A second adjustable stop screw 56 is mounted on base 24 to limit the pivotal movement of arm 38 in the opposite direction to the position shown in Fig. 5 wherein socket 42 is aligned axially with collet 22. Means hereinafter described are provided for momentarily holding arm 38 in the position illustrated in Fig. 4 wherein the socket 44 is aligned axially with collet 22. In the arrangement shown, socket 42 may be considered as a work loading socket and socket 44 as a work unloading socket.

The means for loading and unloading these sockets include a finger 58 pivotally supported on arm 38 by a shaft 60 (Figs. 1 and 3). Shafts 40 and 60 extend transversely of one another so that finger 58 pivots in a plane perpendicular to the plane of pivotal movement of arm 38. At its free end, finger 58 is provided with a pin 62. Pin 62 is aligned with slot 46 at the side of socket 42 and is adapted to sweep through socket 42 when finger 58 is pivoted in the direction towards adapter 28.

Referring now to Figs. 6 and 7, a slide assembly generally designated 64 is mounted for reciprocation on adapter 28 in a direction perpendicular to the plane of pivotal movement of arm 38. Slide assembly 64 includes an actuating plunger 66 slideably arranged in a bore 68 on adapter 28, a loading plunger 70 slideably arranged in a guide member 72 on adapter 28 and a top plate 74 interconnecting plungers 66 and 70 as by screws 76. Plunger 70 is aligned axially with the work piece 34 supported on pins 36. Top plate 74 has an extension 78 at the end of which is mounted a pin 80 in a depending position which is aligned with slot 48 in socket 44 when arm 38 is disposed in the position illustrated in Fig. 3. One end of pin 62 forms a detent 82 arranged to engage in a notch 84 at one end of plunger 66 when arm 38 and finger 58 are disposed in the position shown in Figs. 3, 6 and 7. Finger 58 is adapted to pivot from the position shown in Fig. 6 to the position shown in Fig. 7. When finger 58 pivots from the position shown in Fig. 6 to the position shown in Fig. 7, pin 62 sweeps through socket 42 in the direction towards adapter 28 and detent 82 engages notch 84 in plunger 66 to shift slide assembly 64 in the same direction, thus causing pin 80 to sweep through socket 44 and thus discharge a work piece retained in socket 44 into discharge chute 32. When finger 58 pivots in the opposite direction, slide assembly 64 is shifted from the position shown in Fig. 7 to the position shown in Fig. 6 and plunger 70 loads the work piece resting on pins 36 into socket 42.

Figure 8:
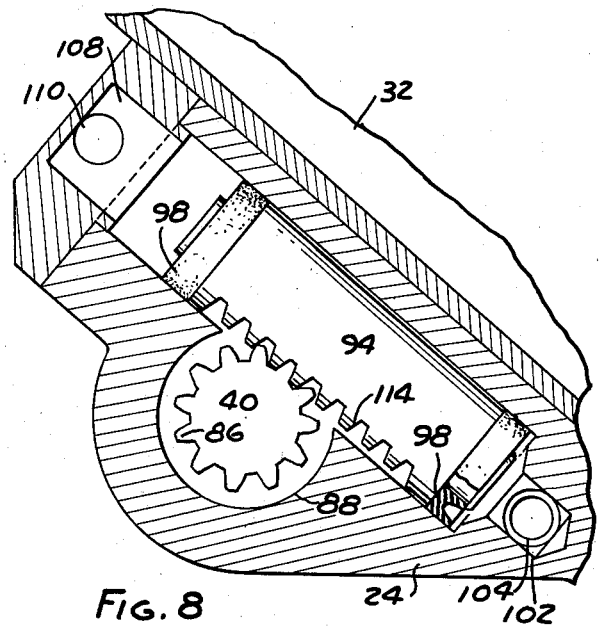
Fig. 8 is a sectional view along the lines 8—8 in Fig. 10.
Figure 9:
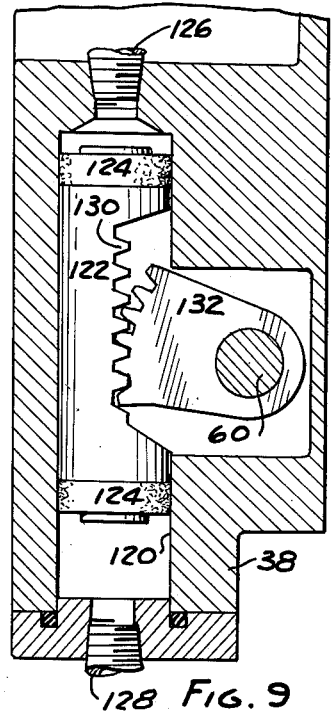
Fig. 9 is a sectional view along the lines 9—9 in Fig. 3.
Figure 10:
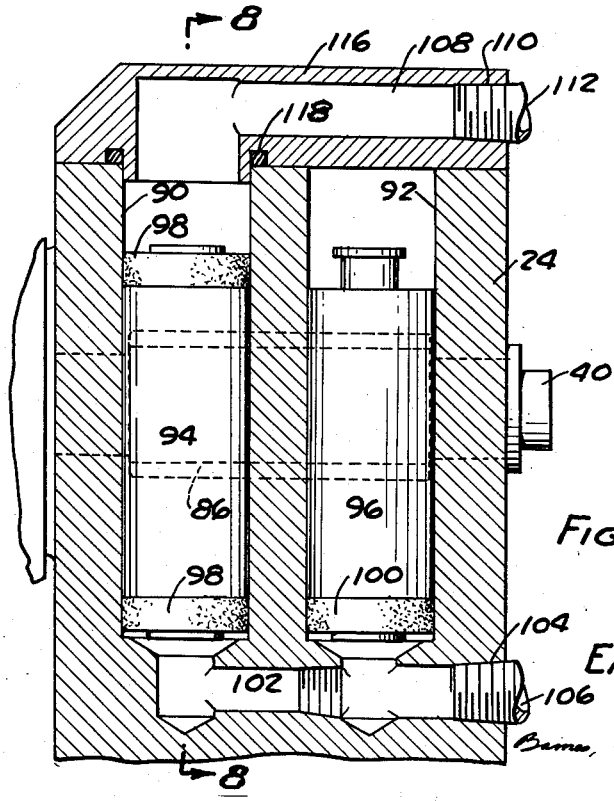
Fig. 10 is a sectional view along the lines 10—10 in Fig. 3.

Referring now to Figs. 3, 8 and 10, it will be observed that shaft 40 on which arm 38 is fixed extends through base 24 and has a pinion 86 mounted thereon and adapted to rotate within a cylindrical recess 88 in base 24. Base 24 is fashioned with a pair of cylinders 90 and 92, the axes of which extend perpendicular to the axis of shaft 40. Within cylinders 90 and 92 are arranged pistons 94 and 96 respectively. Piston 94 is provided with seals 98 at opposite ends thereof and piston 96 is provided with a seal 100 at only one end thereof, in the opposite end of cylinder 92 and cylinder recess 88 are vented to atmosphere. Cylinders 90 and 92 communicate at one end with a passageway 102 terminating in a port 104 to which a conduit 106 is connected. The opposite end of cylinder 90 connects with a passageway 108 terminating in a port 110 to which a conduit 112 is connected. Pistons 94 and 96 are fashioned with gear rack portions 114 meshing with pinion 86 so that as the pistons 94 and 96 reciprocate in cylinders 90 and 92 in response to a different in pressure across the ends of the pistons, shaft 40 and arm 38 are pivoted as a unit in opposite directions.

It will be observed that base 24 is provided with a cover plate 116 at one side thereof in which passageway 108 is formed. An O-ring 118 forms a seal between plate 116 and base 24 around cylinder 90. No seal is provided between cylinder 92 and cover plate 116 so that the air is permitted to leak into and from the space between the unsealed end of piston 96 and cover plate 116.

Arm 38 is also formed with an internal cylinder 120 in which a piston 122 is arranged for reciprocation. Piston 122 is provided with seals 124 at opposite ends. Swivel fittings 126 and 128 are mounted on arm 38 at the opposite ends of cylinder 120. Piston 122 is fashioned with a rack portion 130 which meshes with a pinion segment 132 keyed to shaft 60 on which finger 58 is keyed.

Figure 2:
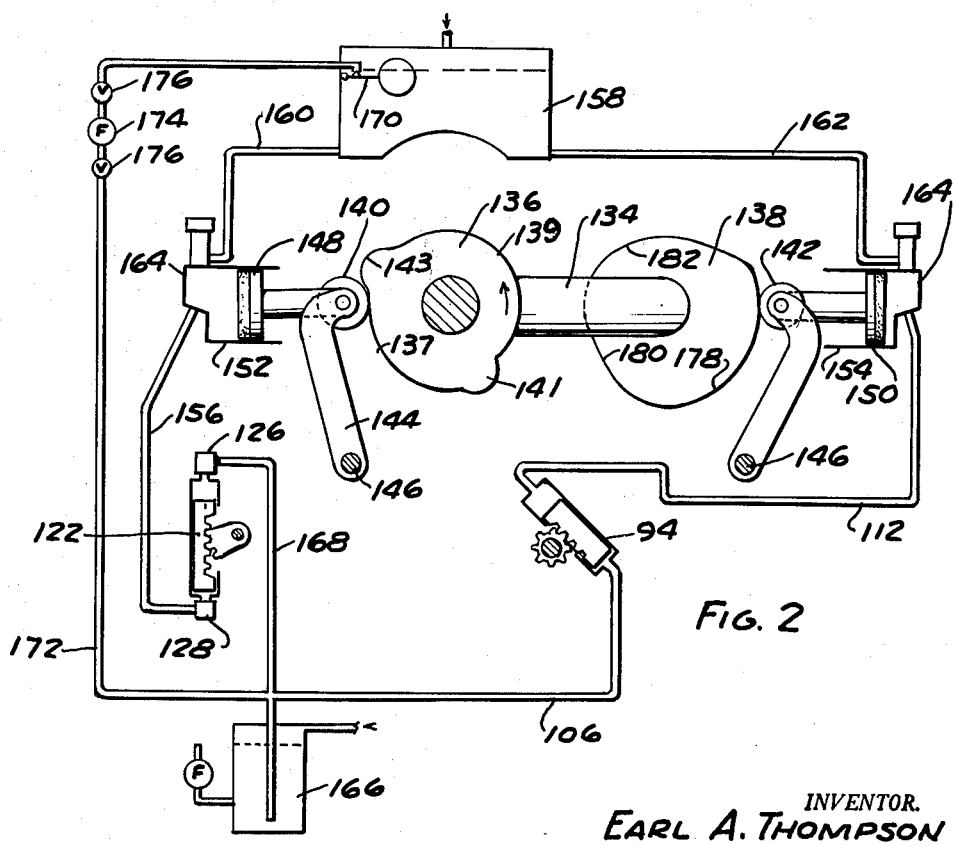
Fig. 2 is a schematic showing of the hydraulic control mechanism for the device.

The arrangement for controlling the movements of arm 38 and finger 58 is shown schematically in Fig. 2. This arrangement includes a shaft 134 which is driven by a suitable power souce, not shown. Shaft 134 has cams 136 and 138 keyed thereto. Cam followers 140 and 142 mounted on arms 144 pivotally supported as at 146 are associated with cams 136 and 138 respectively. Each cam follower actuates a piston 148, 150 in cylinders 152, 154. A conduit 156 extends from cylinder 152 to swivel fitting 128 while conduit 112 connects cylinder 154 with cylinder 90. A supply reservoir 158 contains hydraulic fluid under pressure and connects with cylinders 152 and 154 by conduits 160 and 162 through combined pressure relief and check valves 164. Hydraulic fluid under pressure from an accumulator 166 is directed to one end of piston 122 through a conduit 168 connected to swivel fitting 126 and to one end of cylinders 90 and 92 through conduit 106. The oil level in reservoir 158 is maintained by a float valve 170 that connects with a fluid line 172 extending to accumulator 166. A filter 174 is arranged in line 172 and shut-off valves 176 are arranged on each side of filter 174 to permit cleaning and replacement of the filter.

The hydraulic control mechanism illustrated in Fig. 2 is generally the same as that illustrated in Fig. 8 of my Patent 2,915,855 of December 8, 1959, and a thorough description of the various components of this mechanism including the valve members 164 and the operation of the system appears in said patent.

Insofar as the automatic loading and unloading device of the present invention is concerned, it suffices to say that shaft 134 is rotated at a predetermined speed in relation to the operation that is being performed. Cam 136 controls the operation of finger 58 while cam 138 controls the operation of arm 38. Cam 136 is so shaped that finger 58 will be pivoted to and from the positions shown in Figs. 6 and 7 twice per revolution and in timed relation to the operation of arm 38. Cam 136 for this purpose is formed with two lowermost circular dwell portions 137 and 139 and two uppermost circular dwell portions 141 and 143, which are all connected by suitable camming ramps. Cam 138 is formed with three circular dwell portions 178, 180 and 182 for holding arm 38 in the positions shown in Figs. 3, 4 and 5 respectively. The peripheral surfaces of cam 138 between the dwell portions incorporate the necessary rise and fall to shift arm 38 to the three positions shown. The circumferential extent of the dwell portion determines the dwell of the arm at each of these positions.

When shaft 134 rotates in the direction shown by the arrow in Fig. 2, the parts start from the positions shown in Figs. 2, 3 and 6 and the first action causes the cam follower 140 to ride up the ramp to the dwell portion 143. This shifts piston 122 outwardly, moving the finger 58 from the position shown in Fig. 6 to the position shown in Fig. 7. During this interval, pin 80 sweeps through socket 44 to discharge a work piece therefrom into the discharge chute 32. At the same time, plunger 70 moves out of the path of the work pieces 34, stacked up behind it to permit the lowermost work piece 34 to roll down onto pins 36. Thereafter, follower 140 rides off from dwell 143 down onto dwell 139 and finger 58 is actuated back to the position of Fig. 6, whereby to slide the work piece resting on pins 36 into socket 42.

Figure 4:
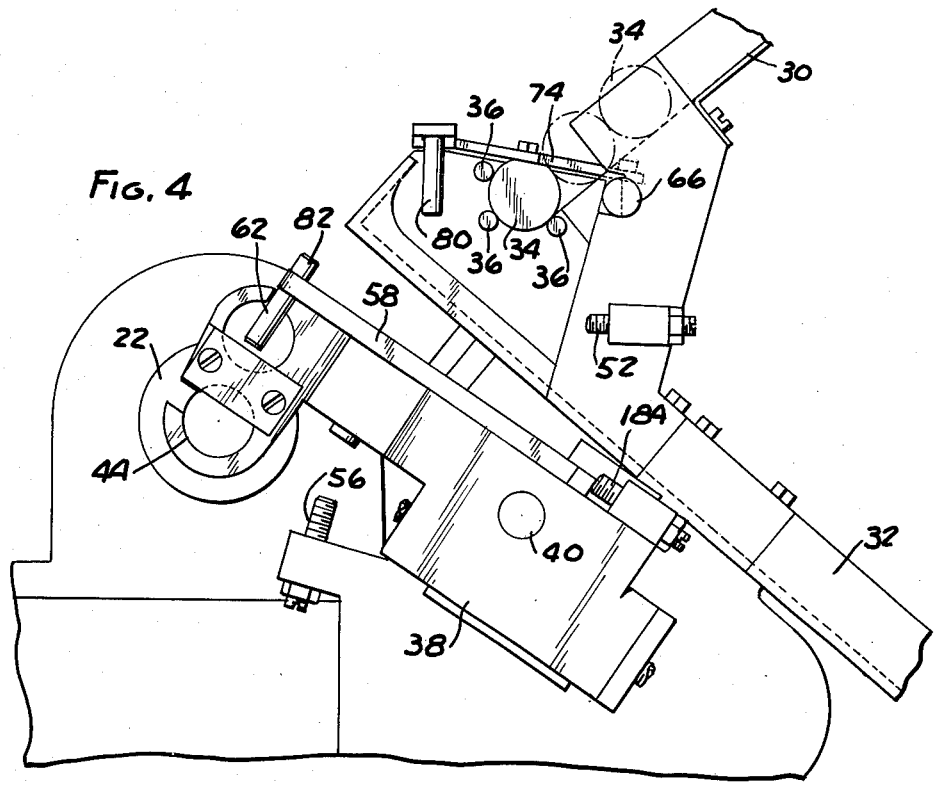
Figs. 4 and 5 are views similar to Fig. 3 and showing the loading arm in its successive positions for unloading and loading, respectively, the collet of the machine tool.

During all of this action by the cam 136, the dwell portion 178 was riding under the follower 142, which next rides off surface 178 down towards the dwell portion 180, thus permitting accumulator pressure to displace pistons 94 and 96 so as to pivot arm 38 to the position shown in Fig. 4 wherein socket 44 is aligned with collet 22. During this interval of time, cam follower 140 is riding over the dwell portion 139 so that finger 58 remains in the position of Fig. 6, abutting against an adjustable stop screw 184 (see Fig. 4).

As the follower 142 rides on surface 180, arm 38 dwells at the position shown in Fig. 4 and finger 58 remains in the position shown in Fig. 6. During this dwell period, unloading means, not shown, on spindle 20 are arranged to discharge a work piece from collet 22 into socket 44. Such unloading means is preferably controlled by a similar hydraulic actuator mechanism operated by another cam, not shown, on shaft 134.

Figure 5:
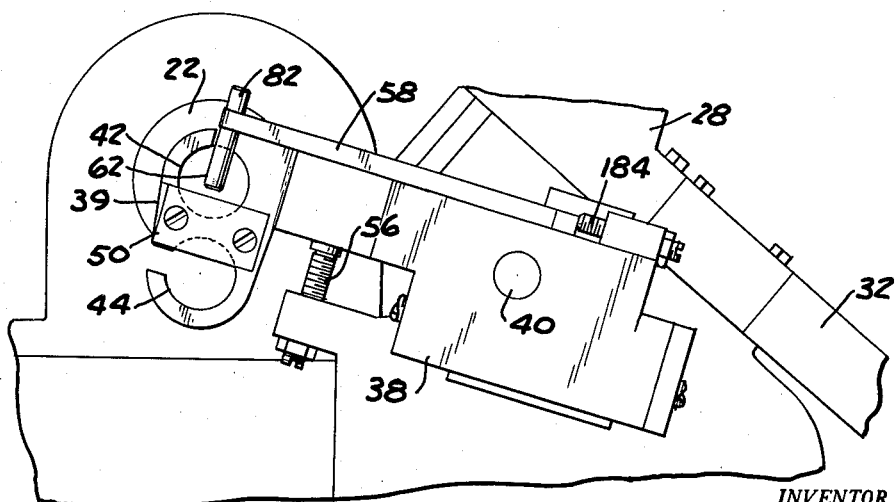

Thereafter, in response to continued rotation of shaft 134, follower 142 rides down from the dwell 180 to the dwell 182, and arm 38 is thereby shifted to the position shown in Fig. 5 wherein socket 42 is aligned with collet 22. While arm 38 dwells at this position, finger 58 is actuated by the follower 140 riding up onto the dwell portion 141. This pushes the work piece previously loaded in socket 42 into the collet 22. Follower 140 then rides down onto the dwell portion 137, returning the finger 58 to the position of Fig. 6.

Next, arm 38 is swung upwardly in response to follower 142 riding upon onto dwell portion 178 so as to again position the arm 38 as shown in Fig. 3. In this position, it will be observed that the detent end 82 of pin 62 engages in the notch 84 of plunger 66 so as to condition the device for the next loading and unloading cycle.

It will be observed that pistons 94, 96 and 122 are subjected at one end at all times to the constant pressure of accumulator 166. In view of the fact that passageway 108 can communicate only with cylinder 90 while the accumulator pressure is applied to the opposite ends of both pistons 94 and 96, there will be no backlash latch between pinion 86 and gear racks 114. Thus, the movement of arm 38 can be controlled very accurately by the design of cam 138 so that accurate alignment of sockets 42 and 44 can be obtained in each of the three positions described. Furthermore, by controlling the movement of arm 38 and finger 58 by the hydraulic control mechanism shown, the movement of these members may be accelerated and decelerated very rapidly so that the loading and unloading operations can be accomplished in a minimum of time. In addition, it will be appreciated that by forming arm 38 with the two sockets 42 and 44, one complete cycle of unloading and loading the collet can be performed by swinging arm 38 just once from the position shown in Fig. 3 to that shown in Fig. 5 (stopping of course at the position of Fig. 4), and then back to the position of Fig. 3. If arm 38 were provided with only one socket, it would have to make two trips down to collet 22 to perform one complete cycle.

What is claimed is as follows:

1. A device for loading and unloading work pieces onto and from a work holder comprising a support, an arm provided with a work piece receiving socket, said arm being pivotally mounted on said support to swing said socket between a work loading position and a work unloading position, hydraulic means for controlling the pivotal movement of said arm between said positions, a finger pivotally mounted on said arm and having a portion projectable into said socket to move a work piece from said socket to said work holder when the arm is disposed so that the socket is in said loading position and hydraulic means for controlling the operation of said finger, said hydraulic means including a rotatable shaft, a pair of cams on said shaft, a cam follower for each cam, a pair of pistons, one of said pistons being arranged to actuate said arm and the other being arranged to actuate said finger, said cam followers being operatively associated one with each of said pistons for synchronizing the pivotal movement of said arm and finger.

2. A device as called for in claim 1 wherein the pivotal mountings of said arm and finger include shafts having pinions fixed thereon, said pistons each having rack portions engaging said pinions.

3. A device as called for in claim 1 wherein the pivotal mountings on said arm and finger include rotatable shafts having pinions fixed thereon and gear means between said shafts and said pistons for rotating said shafts in response to axial movement of the pistons.

4. A device as called for in claim 1 wherein the piston for actuating said arm is reciprocably mounted on said support and the piston for actuating said finger is reciprocably mounted on said arm.

5. A device for automatically loading and unloading a work receiving member comprising a support, means for feeding work pieces one at a time to a work receiving station on said support, means forming a work discharging station on said support, an arm on said support having a pair of work receiving sockets therein, said arm being mounted on said support for pivotal movement from a first position wherein one of said sockets is adapted to receive a work piece from said work receiving station to a second position wherein the other socket is adapted to receive a work piece from said member and to a third position where the first mentioned socket is aligned with the work receiving member, a finger pivotally mounted on said arm and having a portion projectable into said first mentioned socket to transfer a work piece in said socket to said work receiving member when said arm is in said third position.

6. A device as called for in claim 5 wherein said arm is movable to a position wherein said other socket is aligned with said work discharging station on said support.

7. A device for automatically loading and unloading a work receiving member comprising a support, means for feeding work pieces one at a time to a work receiving station on said support, means forming a work discharging station on said support, an arm on said support having a pair of work receiving sockets therein, said arm being mounted on said support for pivotal movement from a first position wherein the two sockets therein are aligned respectively with said work receiving and discharging stations to a second position where one of said sockets is aligned with said work receiving member to receive a work piece therefrom and to a third position wherein the other socket is aligned with said work receiving member, a finger shiftably mounted on said arm and having a portion projectable into said other socket upon pivotal movement of said arm to said third position whereby to transfer a work piece from said other socket to said work receiving member.

8. A device as called for in claim 7 including means operable by said finger to discharge a work piece from said one socket when said arm is disposed in said first mentioned position.

9. A device as called for in claim 7 including means operable by said finger to discharge a work piece from said one socket and to transfer a work piece from said loading station to said other socket when said arm is disposed in said first mentioned position.

10. A device as called for in claim 9 wherein said last mentioned means are arranged to discharge a work piece from said one socket upon pivotal movement of said finger in one direction and to transfer a work piece from said loading station to said other socket upon pivotal movement of the finger in the opposite direction.

11. A device for automatically loading and unloading a work receiving member comprising a support having a work loading station and a work discharging station, a shiftable member on said support having a work receiving socket and a work discharging socket, said shiftable member being movable on said support to a first position wherein the work receiving socket is aligned with said loading station and said work discharging socket is aligned with said discharging station, said shiftable member being movable to a second position wherein said work discharging socket is aligned with the work receiving member to receive a work piece discharged therefrom and to a third position wherein said work receiving socket is aligned with said work receiving member, means controlled in accordance with the movement of said shiftable member to charge a work piece from said loading station into said work receiving socket and discharge a work piece from said discharge socket to said discharge station when the shiftable member is in said first position, and means for transferring a work piece from said receiving socket to the work receiving member when said shiftable member is in said third position.

12. A device as called for in claim 11 wherein said first means are mounted on said support and said second means are mounted on said shiftable member.

13. A device for automatically loading and unloading a work receiving member comprising a support having a work loading station and a work discharging station, means on said support for feeding work pieces one at a time to said work loading station, an arm pivotally mounted on said support and having a work receiving socket and a work discharging socket thereon, said arm being pivoted on said support for movement from a first position wherein said work receiving socket and said work discharging socket are aligned respectively with said work loading station and said work discharging station on said support to a second position wherein said work discharging socket is aligned with said work receiving member to receive a work piece discharged therefrom and to a third position wherein said work receiving socket is aligned with said work receiving member and transfer means for moving a work piece from said work loading station to said work receiving socket and another work piece from said work discharging socket to said work discharging station when the arm is in the first position and for moving a work piece from said work receiving socket to said work receiving member when the arm is in said third position.

14. A device as called for in claim 13 wherein said two sockets on said arm are spaced circumferentially along an arc struck from the pivotal axis of said arm.

15. A device as called for in claim 13 wherein said transfer means comprises a finger pivotally mounted on said arm and having a portion projectable into said work receiving socket when the finger is pivoted in one direction to move a work piece from said work receiving socket to said work receiving member when the arm is in said third position and a slide assembly on said support engageable by said finger when said arm is in said first position to eject a work piece from said work discharging socket when the finger is pivoted in one direction and to move a work piece from said work loading station into said work receiving socket when the finger is pivoted in the opposite direction.

16. A device as called for in claim 15 including hydraulic means for pivotally actuating said arm and finger.

17. A device as called for in claim 16 wherein said hydraulic means includes a piston reciprocably mounted on said support and a second piston reciprocably mounted on said arm, rotatable shafts for pivoting said arm and finger, said pistons being operatively connected one with each of said shafts for rotating the shafts when the pistons are reciprocated.

18. A device as called for in claim 17 wherein said shafts each have a pinion fixed thereon, a pair of gear rack members engaged one with each of said pinions and an operative connection between each piston and its respective gear rack.

19. A device as called for in claim 18 wherein said hydraulic means also includes a rotatable shaft having a pair of cams mounted thereon, a cam follower for each of said cams, a hydraulic circuit controlled by each of said cam followers and connected with said pistons for actuating said pistons in response to actuation of said cam followers when said last mentioned shaft is rotated.

20. A device for loading and unloading work pieces onto and from a work holder comprising a support, an arm provided with a work piece receiving socket, said arm being shiftably mounted on said support to move said socket between a work loading position and a work unloading position, means movably mounted on said arm and having a portion projectable into said socket to move a work piece from said socket to said work holder when the arm is disposed such that the socket is in said unloading position, pinion means operably connected with said arm to move said arm in response to rotation of said pinion means, a pair of pistons reciprocably mounted on said support, gear rack means actuated by said pistons and engaging said pinion means, means for applying a relatively constant pressure to one end of each of said pistons tending to rotate said pinion means in one direction, and means for applying a variable pressure to the opposite end of only one of said pistons for rotating said pinion means in the opposite direction, thereby eliminating backlash between said pinion means and said racks.

21. A device for loading and unloading work pieces onto and from a work holder comprising a support, an arm provided with a work piece receiving socket, said arm being pivotally mounted on said support to swing said socket between a work loading position and a work unloading position, means movably mounted on said arm and having a portion projectable into said socket to move a work piece from said socket to said work holder when the arm is disposed such that the socket is in said unloading position, a rotatable shaft on said support for pivotally actuating said arm, said rotatable shaft having pinion means fixed thereon, a pair of pistons reciprocably mounted on said support, gear rack means actuated by said pistons and engaging said pinion means, means for applying a relatively constant pressure to one end of each of said pistons tending to rotate said shaft in one direction, and means for applying a variable pressure to the opposite end of only one of said pistons for rotating the shaft in the opposite direction, thereby eliminating backlash between said pinion means and said racks.

22. A device as called for in claim 21 including a second rotatable shaft having a cam mounted thereon, a cam follower for said cam, a piston actuated by said cam follower, means forming a closed hydraulic circuit between said last mentioned piston and said opposite end of said first mentioned one piston.

23. A device for handling work pieces into and out of a machine having a work holder comprising a loading arm having two work piece carrying pockets, means forming a combined work piece supply and discharge station, an operating mechanism for swinging the arm cyclicly between a first position with both pockets in co-operative relation to the supply and discharge station, a second position with only one pocket in work transferring relation to the work holder and a third position with only the other pocket in work transferring relation to the work holder, and means operated in timed relation to the arm movements for transferring work pieces both into and out of the pockets while in the first position and into and out of the respective pockets while respectively in the second and third positions.

24. A device for handling work pieces into and out of a machine having a work holder comprising a loading arm having two work piece carrying pockets in fixed positions relative to each other, means forming a combined work piece supply and discharge station, an operating mechanism for swinging the arm back and forth between the work holder and the station including means for stopping the arm sequentially in each of two spaced positions adjacent the work holder, and transfer means operated in timed relation to the arm movements for maintaining one of the pockets filled during arm motion in one direction and the other pocket filled during arm motion in the opposite direction.

References Cited in the file of this patent

UNITED STATES PATENTS

| | | |
|---|---|---|
| 1,945,662 | Smith | Feb. 6, 1934 |
| 2,117,917 | Silven | May 17, 1938 |
| 2,739,717 | Dinsmore | Mar. 27, 1956 |
| 2,802,586 | Wingard | Aug. 13, 1957 |
| 2,919,039 | Hess et al. | Dec. 29, 1959 |

FOREIGN PATENTS

| | | |
|---|---|---|
| 498,441 | Great Britain | Jan. 9, 1939 |